United States Patent [19]

Freeman

[11] Patent Number: 4,740,346
[45] Date of Patent: Apr. 26, 1988

[54] PERIMETER RESIN FEEDING OF COMPOSITE STRUCTURES

[75] Inventor: Richard B. Freeman, Wilmington, Del.

[73] Assignee: The Budd Company, Troy, Mich.

[21] Appl. No.: 833,304

[22] Filed: Feb. 26, 1986

[51] Int. Cl.⁴ .............................................. B29C 43/18
[52] U.S. Cl. .................................. 264/258; 264/102; 264/314; 264/328.8; 264/328.12
[58] Field of Search ............ 264/257, 258, 314, 328.8, 264/328.12, 102

[56] References Cited

U.S. PATENT DOCUMENTS

| | | | |
|---|---|---|---|
| 3,137,898 | 6/1964 | Geringer | 264/314 |
| 3,626,051 | 12/1971 | Liautaud | 264/328.8 |
| 3,978,186 | 8/1976 | Lovejoy | 264/328.8 |
| 4,493,808 | 1/1985 | Sedlatscheh | 264/328.12 |
| 4,497,766 | 2/1985 | Olsson et al. | 264/328.8 |
| 4,521,354 | 6/1985 | Engelke et al. | 264/328.12 |
| 4,560,523 | 12/1985 | Plumley et al. | 264/314 |

*Primary Examiner*—James Lowe
*Attorney, Agent, or Firm*—E. M. Farrell; Herman Foster; T. I. Davenport

[57] ABSTRACT

A resin transfer molding system includes a plurality of ports for injecting resin into reinforcement material, which preferably comprises fabric, disposed between upper and lower mold pieces to form a structural part. Channels are provided adjacent the fabric reinforcement material and act as reservoirs to permit relatively fast and efficient injection of the resin without excessive applied pressure.

1 Claim, 2 Drawing Sheets

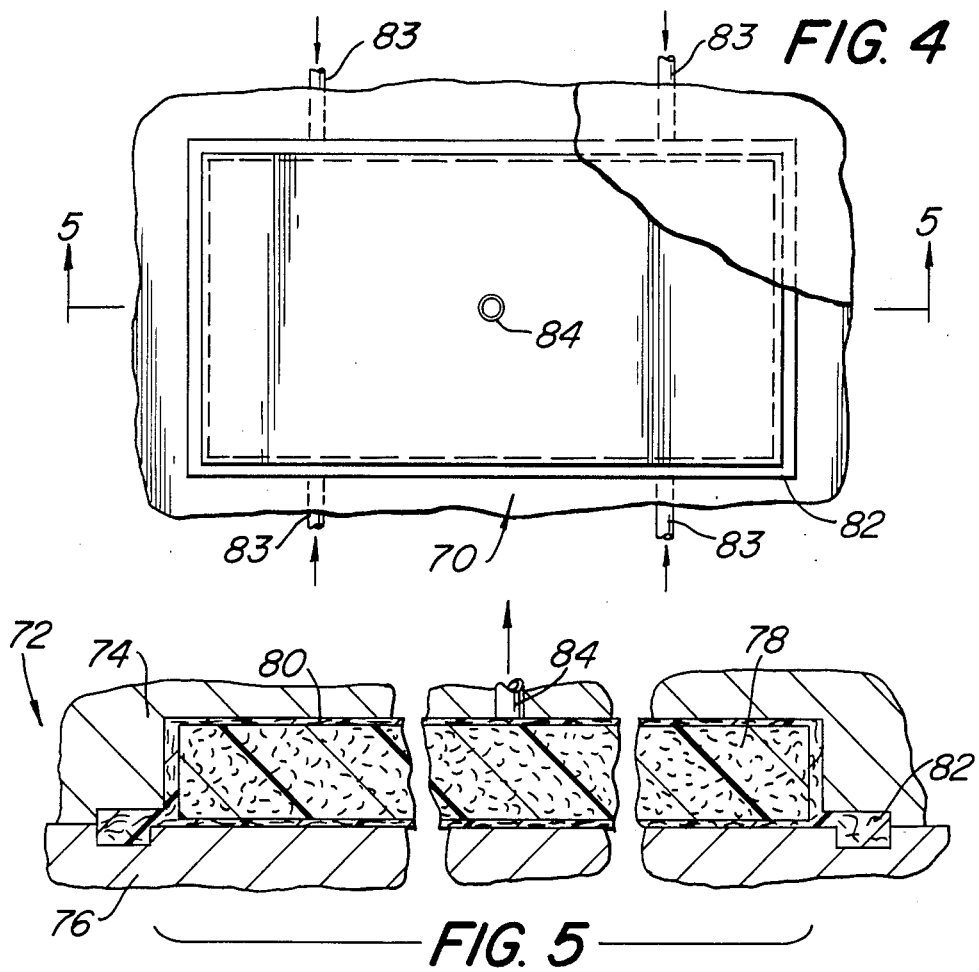
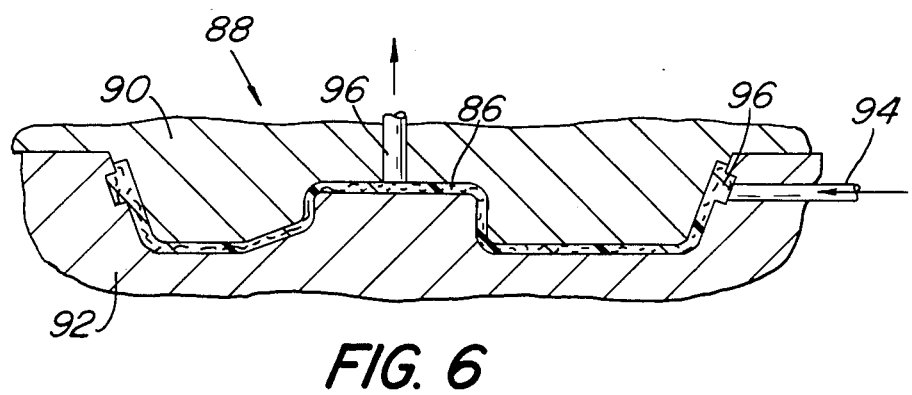

PERIMETER RESIN FEEDING OF COMPOSITE STRUCTURES

In a copending patent application, Ser. No. 768,259 filed Aug. 22, 1985, assigned to the same assignee as the present application, there is described a method of forming a hollow fiber reinforced structure of varying cross sections. The method includes impregnating fiber material while utilizing an inflatible bladder. This present application utilizes some of the steps described in the copending application.

The aforementioned application involves resin transfer molding (RTM). In this copending application resin is applied to fiber material disposed between an upper and lower mold piece, with an inflatible bladder occupying the hollow area of the structure being formed.

Many composite structures formed by resin transfer molding (RTM), as illustrated in the copending application, utilize an injection port for injecting the resin and a vent port for venting air during the resin injection. While the system described in the copending application is generally satisfactory, it provides some inconvenience when large structures are to be formed.

For large structures, such as sandwich panels, automotive floor pans or hoods, decks, fenders as well as other parts, the feeding of the part from a single central port results in some disadvantages. For example, the further the resin flows from a single central fill port, the greater area of reinforcement which must be impregnated. This requires higher inlet resin pressures and results in slower port fillout.

OBJECTS OF THE INVENTION

It is an object of this invention to provide an improved resin transfer molding system and method.

It is a further object of this invention to provide an improved resin transfer molding system and method in which the pressures at which the resin is injected is minimized.

It is still a further object of this invention to provide an improved resin transfer molding system and method in which the speed at which the resin may be injected is greatly increased.

BRIEF SUMMARY OF THE INVENTION

In accordance with the present invention, resin is applied to a fabric material disposed between upper and lower mold pieces to form a structural member. The resin is applied under relatively low pressure through a plurality of ports to fill one or more channels or grooves which act as reservoirs which are disposed adjacent to the reinforcement material, which may be made of a fabric material. Vents are disposed to vent the air as the resin is injected into the fabric material.

Other objects and advantages of the present invention will be apparent and suggest themselves to those skilled in the art, from a reading of the following specification and claims, taken in conjunction with the accompany drawings.

BRIEF DESCRIPTION OF THE DRAWINGS

FIG. 4 is a front view of a panel structure which may be formed utilizing the present invention;

FIG. 5 is a cross sectional view taken along lines 5—5 of FIG. 4, and

FIG. 6 is a cross sectional view illustrating the formation of another irregular shaped member, in accordance with the present invention.

DESCRIPTION OF THE PREFERRED EMBODIMENT

The present invention will be described in connection with the embodiments illustrated in FIGS. 1, 4 and 6. The invention is directed toward increasing the speed at which the structures may be impregnated with resin. Also, the amount of pressure required to inject the resin may be minimized when the present invention is employed, thereby reducing the possibility of high pressures "washing" or displacing the reinforcement material.

Figure 1:
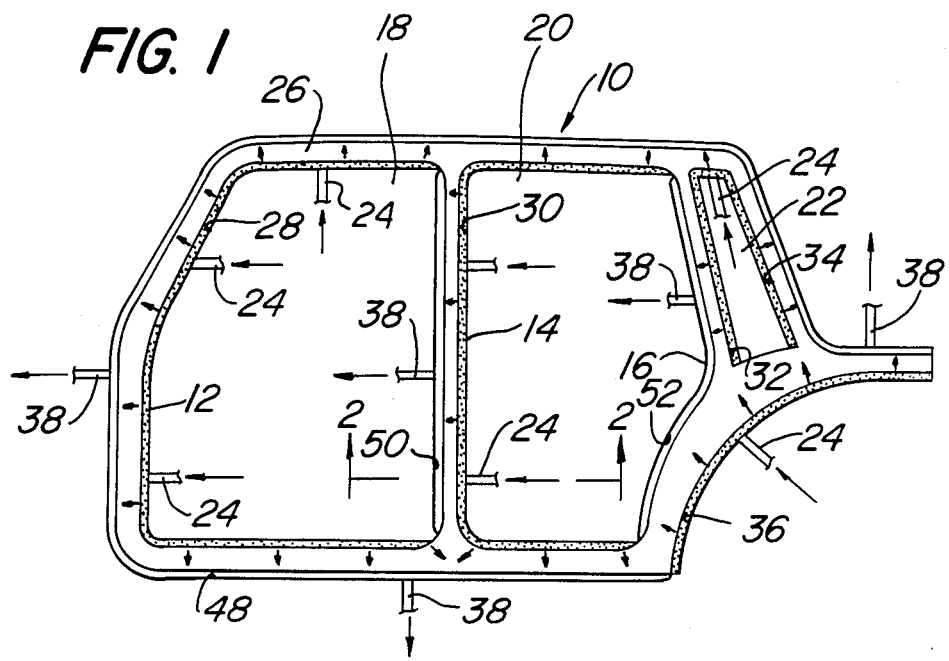
FIG. 1 is a side view, partly broken away, of an automotive side frame structure, of the type which may be formed using the present invention.

Referring to FIG. 1, an automotive frame 10 is illustrated. The frame may include front post 12, center post 14 and rear post 16. The frame is designed to provide door openings 18 and 20 and a window opening 22.

Reference is made to the previously mentioned copending application, Ser. No. 768,259, filed Aug. 22, 1985. In this application a portion of an automobile structure is illustrated which forms part of a door frame for an automobile. The frame may include various joints, curved surfaces and areas of irregular cross sections. A singular integral cured structure was formed from several prelocated, but unimpregnated, fiber pieces which were subsequently injected with resin and suitably molded and cured. The structure included a hollow area extending thereto. The present invention includes many of the steps illustrated in the copending patent. In the present invention, however, the structure 10 is much larger than the structure illustrated in the copending application.

Because of the relatively large structure involved in the present application, if a single source of resin was used to impregnate the structure 10, a relatively long time would be involved to complete the impregnation of a single structure. Also, a relatively high amount of pressure would be required to inject the resin. High input pressures may collapse the inflatable bag used or may displace the fabric material.

Figure 2:
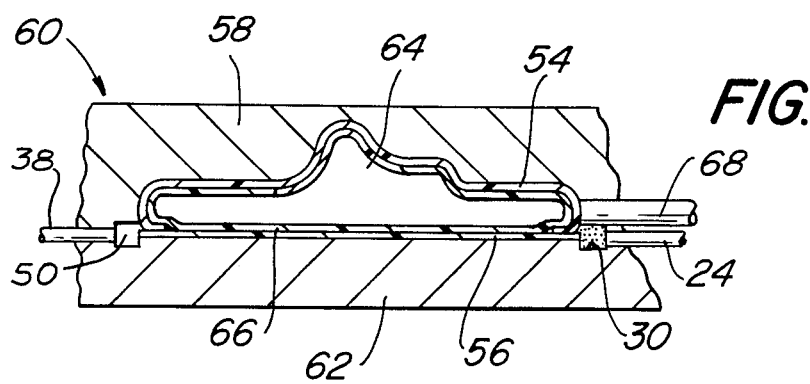
FIG. 2 is a cross sectional view, taken along lines 2—2 of FIG. 1, including upper and lower molds not illustrated in FIG. 1.
Figure 3:
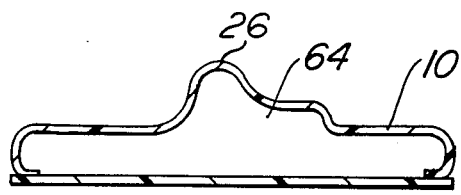
FIG. 3 is a cross sectional view of the part formed, as illustrated in FIG. 2.

Referring again to FIG. 1, along with FIGS. 2 and 3, a source of resin is connected to a plurality of inlet ports 24 to impregnate the fiber material 26 which ultimately forms the solid structures. Between the resin inlet ports 24 and the fibrous material 26, there are provided a plurality of channels or reservoirs 28, 30, 32, 34 and 36. The grooves or reservoirs are disposed adjacent the fibrous material 26. Channels or reservoirs receive the resin from the ports 24. When the resin is applied under pressure, the fibrous material 26 is impregnated with the resin. A plurality of air vents 38 is provided to vent the air as the resin is injected into the fibrous material. Vent groove 48 is disposed about the periphery of the frame, vent groove 50 is disposed at the center post 14, and vent groove 52 is disposed at the end post 16 to facilitate the venting of the air to the vent ports 38.

In FIG. 1, for purposes of explanation, the pieces are not illustrated. However, the various channels for reservoirs for receiving the resin are actually part of the mold involved, and may be in the upper or lower mold piece. Likewise, the air vent grooves also form part of the mold involved.

Referring to FIGS. 2 and 3, a single integrally cured structure then is developed from several prelocated fibrous pieces, such as pieces 54 and 56. The piece 54 is placed within the inner wall of the piece 58 of a mold 60 and is lapped over the piece 56. The piece 56 is disposed on the inner wall of the lower piece 62 of the mold 60. A hollow area 64 extends through the structure, as in the aforementioned copending patent application.

Prior to closing the mold 60, an inflatible bladder 66, is inserted between pieces 54 and 56. The bladder may comprise a plurality of pieces cut to suitable shapes and sizes, corresponding to the shape and size of the structure to be formed.

Air, or other suitable gas from a pressurized source, is applied through a conduit 68 into the inflatible bladder 66 causing it to inflate to force it against the fibrous pieces 54 and 56.

With the mold 60 closed, resin under pressure is forced through the inlet ports 24 into the various reservoirs or channels into the fibrous material. Air is vented from the fibrous material from ports 38 as the resin is being injected to insure that there are no voids in the fibrous material.

Following are steps for impregnating the fibrous material with resin, a curing operation is performed. Depending upon the chosen resin, the curing could be done either at room temperature or an elevated temperature, which involves heating the fibrous material with the resin while under pressure. The curing completes the formation of the structure 10, which is the side frame illustrated in FIG. 1.

Referring to FIGS. 4 and 5, a sandwich panel structure 70 is formed between a mold 72, which includes upper and lower pieces 74 and 76. The sandwich panel structure 70 includes urethane material 78 at a core surrounded by fiberglass or other fibrous material skins 80. A channel or reservoir 82 is disposed about the periphery of the main panel structure 70. Resin is injected to the skin 80 from resin inlet ports 83 to the reservoir 82 to the skin 80.

It is noted that resin is injected completely around the panel or structure edge to allow molding of the complete structural edging as well as the sandwich skin. In one embodiment of the invention, the skins were 0.035 inches thick fiberglass, which is relatively thin with respect to RTM. The perimeter resin feeding permitted such a thin skin to be completely impregnated.

An air vent 84 disposed toward the center of the panel is centrally disposed. The single air vent 84 is relatively close to all the inlet resin ports 83. This permits relatively fast injection of the resin under relatively low pressure. The vent port 84 extends completely through the foam core as illustrated by the dotted lines.

Referring to FIG. 6, a fiber structure 86 is formed between a mold 88 which includes upper and lower pieces 90 and 92. Resin is injected through a conduit 94 into a channel or groove 96, which is disposed about the periphery of the fibrous piece 86. An air vent 96 is centrally disposed to vent the air as the resin is injected into the piece 86. As in previous embodiment, a plurality of conduit 94 may be provided to assure fast resin injection at relatively low pressure.

What is claimed is:
1. A method of forming a solid fiber reinforced hollow structure having irregular cross sectional areas comprising the steps of:
   (a) providing a mold having upper and lower pieces with one of said pieces including a first plurality of resin channels for receiving resin;
   (b) placing different areas of layers of fibrous material of said irregular cross sectional areas along the inner walls of said upper and lower pieces directed adjacent said first plurality of resin channels;
   (c) placing an inflatible member within said fibrous material between said layers of fibrous material in said upper and lower mold pieces;
   (d) closing said mold pieces;
   (e) inflating said inflatible member;
   (f) providing a plurality of inlet ports connected to said first channels with at least one inlet port being provided for each channel;
   (g) injecting resin through said plurality of inlet ports into said first resin channels and then directly into the different areas of said fibrous material;
   (h) providing a plurality of air vent channels directly adjacent said fibrous material with air port vents connected thereto with at least one air vent channel being provided for each of said inlet ports in said first plurality of resin channels, and
   (i) curing said fibrous material to form said solid fiber reinforced structure, whereby said plurality of inlet ports and air vents permit relatively fast resin injection to form said solid fiber structure.

* * * * *